INHIBIT LOGIC CIRCUIT

Original Filed June 3, 1959 3 Sheets-Sheet 1

INVENTORS
KENNETH O. KING
GEORGE F. MINKA

BY Louis A. Kline
John J. Marlago
Nathan Cass
THEIR ATTORNEYS

| | A | B | C | Su | Ka | C,1→0 | C,0→1 |
|---|---|---|---|---|---|---|---|
| 1 | 0 | 0 | 0 | 0 | 0 | 0 | 0 |
| 2 | 0 | 0 | 1 | 1 | 0 | 1 | 0 |
| 3 | 0 | 1 | 0 | 1 | 0 | 0 | 0 |
| 4 | 0 | 1 | 1 | 0 | 1 | 0 | 0 |
| 5 | 1 | 0 | 0 | 1 | 0 | 0 | 0 |
| 6 | 1 | 0 | 1 | 0 | 1 | 0 | 0 |
| 7 | 1 | 1 | 0 | 0 | 1 | 0 | 1 |
| 8 | 1 | 1 | 1 | 1 | 1 | 0 | 0 |

Sum (Su)= A'B'C + A'BC' + AB'C' + (ABC) ---------- (Eq.1)
Carry Gen (Ka)= A'BC + AB'C + ABC' + (ABC) ---------- (Eq.2)

INVENTORS
KENNETH O. KING
GEORGE F. MINKA

BY Louis A. Kline
John J. Matlago
Nathan Cass
THEIR ATTORNEYS

INHIBIT LOGIC CIRCUIT

Original Filed June 3, 1959 3 Sheets-Sheet 3

INVENTORS
KENNTH O. KING
GEORGE F. MINKA
BY Louis A Kline
John T. Matlago
Nathan Cass
THEIR ATTORNEYS 3,244,902
INHIBIT LOGIC CIRCUIT Kenneth O. King, Rolling Hills, Calif., and George F. Minka, Sydney, New South Wales, Australia, assignors to The National Cash Register Company, Dayton, Ohio, a corporation of Maryland Original application June 3, 1959, Ser. No. 817,851. Divided and this application Nov. 30, 1964, Ser. No. 414,535
10 Claims. (Cl. 307—88)

This application is a division of patent application Serial No. 817,851, filed June 3, 1959.

This invention relates to means applicable, among other uses, to digital processing and control systems, such as, for example, digital data processors; and in which systems logical operations which may be defined in terms of Boolean algebra are performed upon information represented in binary signal form. More specifically, the invention relates to systems of the characteristics noted, in which the logical operations are performed by devices or elements capable of producing an output when coerced from one physical state to another, and in which systems binary information is stored in bistable devices. By the term bistable devices is meant devices possessing two stable physical states.

Digital data processing and digital control systems which use bistable magnetic cores as storage elements for storing information represented in binary signal form, are now well known in the art. The magnetic cores therein used are made of a material having an approximately rectangular hysteresis loop and having a sharply defined saturation flux value. Therein, also, a core is considered to be storing a binary digit one when it is in a first of its two opposite remanent magnetic conditions or states (commonly symbolically represented by 1), and to be storing binary digit zero when it is in the second remanent state (commonly represented by 0). Further, systems are known in which diodes are used in performing logical operations upon binary information, and in which bistable magnetic cores are employed as storage elements for storing the information. The reliability of diodes and such solid-state electronic devices used in performing the logical operations, while presenting a considerable improvement over the previously used electron-tube means, is nevertheless not as good as may be desired. Diodes, transistors, and like devices are temperature-sensitive and have useful lifetimes which are variable and dependent upon duty cycle, ambient temperature, etc. Accordingly, the reliability of the logical operations performed by, for example, diode and magnetic core devices, is actually not much superior to that attained when the operations are performed with the generally used diode logic circuit means. The present invention contemplates performance of logical operations by devices capable of being forced or coerced to either of first and second physical states from the other and capable of producing an output manifestation or signal when thus coerced from either such state to the other. In the exemplary illustrative embodiment of apparatus according to the invention, bistable magnetic devices each comprising a magnetic core and associated windings or coils, are used as the only elements actually performing the logical operations. Such magnetic elements are readily coercible from either of opposite stable magnetic states to the other, and when coerced cause an output potential to be produced in an output winding inductively linked tthereto. And since such magnetic devices or elements operate with indefinitely long or "permanent" lifetime and within any temperature range between −200° C. and 200° C. with practically 100% reliability, the invention contemplates a rather considerable improvement in reliability of logic-performing circuitry. Further, by employing a novel type of logic which is hereinafter explained, the invention permits a considerable reduction in the amount of "hardware" or components that is required to mechanize a particular set of logical operations, while concurrently rendering much less critical the choice of components, values of currents, and timing of operations. The novel type of logic does, in fact, permit logical operations of all sorts to be accomplished in a facile and practical mode by bistable magnetic devices of the type mentioned.

As previously indicated, the exemplary apparatus used to illustrate the principles of the invention uses as the logic-performing elements of an operable logical system, two-state elements such as bistable magnetic cores each having a respective set of windings. The set of windings includes at least one output winding in which an output signal is induced whenever the core is "flipped" (that is, is caused to change state), at least one power winding in which winding (or windings) the coercing current (or currents) which effect recurrent change of state of the core course, and one or more "inhibit" windings which selectively conduct current (or do not conduct current) whereby the core is (or is not) inhibited from being flipped by the coercing current or currents. In the exemplary apparatus, inhibiting coercive effort or force is provided by current from one or more bistable devices of novel construction.

Herein, the two opposite states to which each two-state element is alternately coerced or driven are designated 0 and 1, respectively. Operations are conducted according to what is termed as two-phase mode. A first phase comprises a period wherein any two-state element may be changed in state to produce an output signal (or inhibited to prevent production of an output signal); and the second phase comprises a period of time during which transient forces and signals in the system decay and during which preparations are made for an ensuing cycle of operations. The first phase is herein termed the "write" period, and the second phase is termed the "read" period, solely for definition purposes. In the exemplary apparatus herein described, the bistable magnetic cores may be flipped from 0 to 1 during the write period and reversely flipped from 1 back to 0 during the read period. An output pulse of a first polarity is induced during the 0 to 1 flip, and a pulse of the opposite polarity is induced during the return flip. While either output pulse could be used, that pulse produced during the read period, that is, during the 1 to 0 flip, is selected for use. Also, in the exemplary apparatus, all the cores are stressed toward the 0 state by a constant bias coercive force which is great enough to coerce any and all of the cores from 1 to 0 in the absence of a write clock. This coercive force, herein termed negative, is supplied by a constant bias current which is passed through one set of drive windings including a winding for each core. In addition, each core is recurrently subjected to a positive coercive force opposite to and of twice the strength of the bias, by recurrent "clock" pulses which course through a second set of drive windings. The clock pulses thus are of strength sufficient to overpower the bias and drive a core from 0 to 1. Thus the system of the exemplary apparatus according to the invention prescribes that any core will be flipped from 0 to 1 by a clock pulse and reversely flipped from 1 to 0 by the bias at the termination of the clock pulse, unless such action is prevented or "inhibited" by one or more negative coercive effects of sufficient strength to, when added to the bias, prevent flipping of the core by the positive clock pulse. Flipping of cores from 0 to 1 occurs during the write period of a cycle, hence it is during the write period that logical operations will be considered to be performed. The outputs produced by induction in an output or "sense" winding as a core flips, during a read period, indicates the result of the logical operation or step performed, as will hereinafter be made fully evident.

Output or sense lines, each including one or more sense windings, serve as input lines to one or more of dual-input dual-output bistable devices, whereby each such device is selectively caused to assume (or to continue to reside in) one or the other of its two stable states, dependent upon which input is energized by a sense line output of proper polarity. In this manner the binary result of the logical operation is stored in the device (or devices) and is represented by the particular stable state in which the device is left residing. The outputs of any of such bistable devices are characterized by being currents, one or the other of which is flowing at any time, but, in general, not both flowing concurrently. Such currents are used, in accord with principles of the invention, to provide the mentioned preventing or inhibiting coercive efforts, by being passed through inhibit windings on the proper cores. However, as will hereinafter be made evident, the currents may also be employed for other control purposes. The currents accordingly are such as to produce the required inhibiting or control forces.

In the exemplary apparatus illustrative of the principles of the invention, the current outputs of the bistable devices are used to represent the Boolean inverses or primes of Boolean terms or propositions which are to be operated upon in accordance with stated logical (Boolean) equations. These inverses or primes of terms or propositions are selectively utilized in accord with principles of what is herein termed "inhibit core logic," to prevent the clock pulse of the next cycle of operations from flipping to 1 the core or cores to which the respective proposition inverses are applied. It is important to note, during this brief general description of characteristics of the invention, that the power for driving the cores, and hence for performing the logical operations, is not furnished by or supplied through the currents representing inverses of the terms or propositions. The necessary power is, rather, furnished by the clock and bias currents. By this procedure the bistable devices or other circuit devices which furnish the terms or propositions are relieved entirely of the burden of supplying power to the cores. When an inhibiting current is flowing, there is no possibility of reversal of state of a core having a winding coursed by that current, hence no appreciable amount of energy is consumed from the currents in windings linked to the core. This is, in general, not true in the generally practiced type of core logic, wherein the proposition signals are often called upon to supply the power to reverse the state of a core.

Further, in accord with the invention, the logical and (logical product) function is generated for any number N of propositions, by using but one core, that core having linked thereto respective windings for the clock, the bias, the sense line, and inhibit windings one for each respective one of the N propositions. As will be shown, several such product functions are readily summed by provision of windings and a single core for each respective logical product, and a single sense line linked to all of the product cores. These features and characteristics, also, will hereinafter be fully explained in conjunction with a description of the preferred exemplary physical means embodying the principles of invention.

It is, then, a principal object of the invention to provide means simpler than those heretofore known, for performing logical operations on information represented by binary signals.

Another object of the invention is to provide an improved mode for performing logical operations or information represented by binary signals.

Another object of the invention is to provide an improved bistable state device capable of furnishing directly the current for performing the inhibiting actions on magnetic core logical elements.

Another object of the invention is to provide a faster operating logical system functioning in the inhibit core logic mode.

An additional object of the invention is to provide a fast-operating system of exceptionally high reliability for performing logical operations upon binary signals.

Another object is to provide an improved type of logical circuitry for performing logical operations upon binary signals.

Another object of the invention is to provide a new mode of producing a signal or manifestation representing the logical product of propositions represented by respective signals.

Another object of the invention is to provide a novel mode for mechanizing logical operations.

Another object of the invention is to provide simpler and more economical mechanization of logical operations.

The foregoing objects and advantages of the invention, and others thereof which will hereinafter be made apparent or become apparent through consideration of the following description and the appended claims, are anticipated or accomplished by the invention, a preferred illustrative physical embodiment of which is schematically depicted in the accompanying drawings forming a part of this specification, and in which drawings:

FIGS. 1*a* and 1*b* are diagrams illustrating special characteristics of exemplary magnetic devices and of coercive forces used to operate the magnetic devices;

FIG. 1*c* is a set of waveform diagrams;

FIG. 1*d* is an explanatory diagram illustrating one type of magnetic element or core, and windings inductively linked thereto;

FIG. 1*e* is a symbolic diagram representing the core of FIG. 1*d* and appropriate signals;

FIGS. 1*f* and 1*g* are symbolic diagrams symbolically illustrating a particular feature of the invention;

FIGS. 2*a*, 2*b* and 2*c* are symbolic diagrams in extension of those depicted in FIGS. 1*f* and 1*g*, symbolically illustrating additional particular features of the invention;

In certain respects and aspects this application presents improvements upon the invention disclosed in co-pending application Serial No. 615,279 of Ladimer J. Andrews et al., filed October 11, 1956 and now U.S. Patent No. 3,040,986.

Figure 1A:
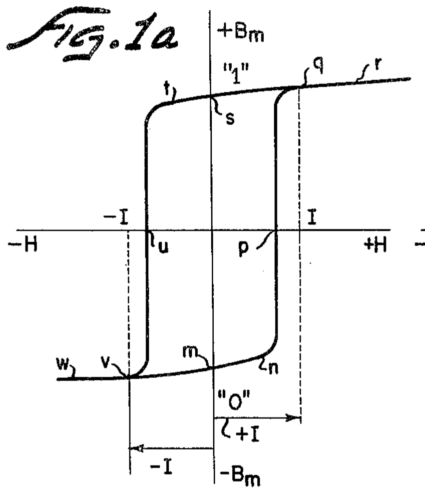

Referring to the drawings, and first to FIG. 1*a*, the operation of an exemplary two-state logical element, in the form of a magnetic device or core, as performed in accordance with the concepts of the present invention will be explained. The figure represents the so-called B-H curve, or cyclical magnetization loop, of a typical bistable magnetic core of well known type, and is a plot showing magnetic induction or magnetization of the core under different degrees of both positive and negative coercion effected by recurrently repeated applications of coercive effort by magnetic field of alternating polarities. The ordinates (B) of the plot are in units of magnetic induction, such as gausses; and the abscissae (H) in units of field strength, such as oersteds. Having once been magnetized substantially to saturation by a negative field, the core assumes a remanent state of magnetization indicated by point *m* on the curve. Upon application of an increasing positive coercive effort, the magnetization value progresses along the plot from point *m* successively to points *n*, *p* and *q*, during which progress there is at first a relatively small change of magnetization to a point *n*, followed by a relatively large change through point *p* to point *q*, with only a small corresponding increase of applied positive field or coercive effort. During the large change of magnetization from *m* to *q*, the polarity of the magnetic device reverses and the device is said to change state of flip. Further increase in the applied positive field drives the magnetization toward and possibly beyond a value indicated at point *r*, at which point the core or device is substantially saturated in the magnetic sense. Thereafter, removal of the applied field or coercive effort results in the magnetization relaxing to a remanence value indicated by point *s*, which is comprised in the other of the two stable magnetic states in which the core can repose or reside in the absence of any applied field.

Figure 1B:
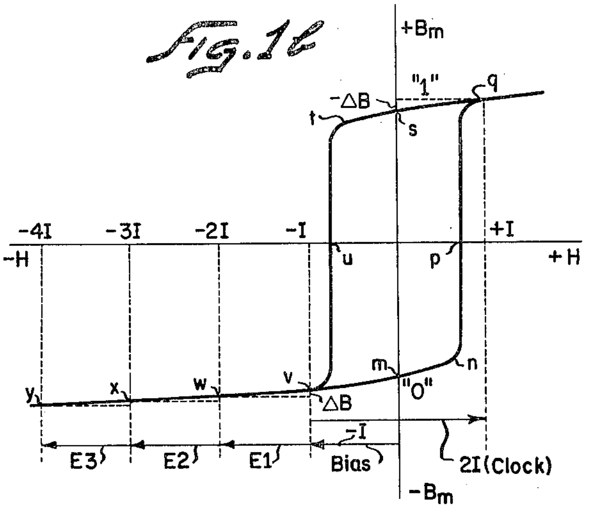

The mentioned magnetic cycle is completed in a similar manner, with successive application and removal of an oppositely directed (negative) magnetizing force or field ($-H$), during which corresponding magnetization values *t*, *u*, *v* and *w* are reached, and the magnetization relaxing to the remanent state value indicated at *m* incident upon removal of the magnetizing force or field. When the magnetization is positive, as when at values such as *q*, *r*, *s* and *t*, the core or element is herein considered to be in the 1 state; and when the magnetization is negative, as exemplified at values *n*, *m*, *v* and *w*, the core is said to be in the 0 state. In the following explanation, the coercive effort or force necessary to drive the magnetization from the value indicated at *m* to the value indicated at *q*, will be represented by the expression I; and similarly, the effort required to reversely coerce the core from magnetization value *s* to value *v* will be designated by —I. In each case the subsequent removal or disappearance of any applied coercive effort will result in the core relaxing to a respective adjacent remanent state value, such as that of *s* or *m*. Vectorially, these two values of coercive effort or effect may be represented as indicated at the lower part of FIG. 1*a*, one being positive, and the other negative. Referring now to FIG. 1*b* which depicts a similar magnetization plot with an extension in the application of negative coercive efforts, it is evident that if the core were in the 0 state and a first coercive effort of +2I value were concurrently applied with a second effort of —I value, the net effect would be the same as the application of a single effort of value equal to +I, and the core would be driven to 1 and the magnetization would relax to point *s* upon termination of the two coercive efforts. Of course, if under the mentioned concurrent application of efforts —I and +2I the core were already at state 1, no reversal of state would occur.

Considering further the diagram in FIG. 1*b*, it is evident that if a negative coercive force or effort of —I value is continuously applied to a core the magnetization will be changed from its normal remanence value, to a value such as that indicated at *v*. In effect, the remanence point will be shifted to point *v* and the core will be continuously stressed with a negative coercive force while remaining in 0 state. If now, with the continuous negative (—I) coercive force still effective, the core is subjected to a positive coercive force of +2I value, the magnetization of the core will be shifted through values at points *m*, *n* and *p*, to that at point *q*. During this magnetization shift, the core will be changed in state from 0 to 1 while still under stress of the negative coercive (bias) effort. During continuance of the +2I force, the magnetization will be held at value *q*. Upon termination of the +2I coercive force, the normal tendency of the core to relax to remanence points is augmented by the continuing negative bias, the latter reversely driving the magnetization through points *s*, *t* and *u* to point *v*. Thus the —I bias effort reverses the state of the core from 1 to 0. As previously noted, an output potential may be derived from a secondary or output winding inductively linked to the core, at either or both of the changes of state. In the presently described exemplary apparatus, the steady negative bias (—I) is preferably (but not necessarily) continuously applied to all of a set of magnetic cores, and all of the cores of the set are recurrently subjected to a positive clocking coercive effort of +2I value, whereby each core, unless otherwise prevented or "inhibited," is changed in state from 0 to 1 and then reversely driven from 1 to 0. At any cycle of operation one or more additional coercive efforts of —I value (or greater) may be added to that of the continuous bias, and thus inhibit or prevent the core being driven from 0 to 1 by the +2I clocking effort. Three such additional or inhibiting efforts each of —I value are vectorially represented as E1, E2, and E3 in FIG. 1*b*; and all or any of these efforts as well as those of the bias and the clock may be produced and applied to a core as indicated in FIG. 1*d*. In the latter figure, efforts E1, E2 and E3 are produced by respective ones of currents A, B and C as indicated, supplied from a signal source PSS. The current or currents tending to recurrently drive the core 20 from 0 to 1 and back to 0 are supplied by a source PM.

Figure 1C:
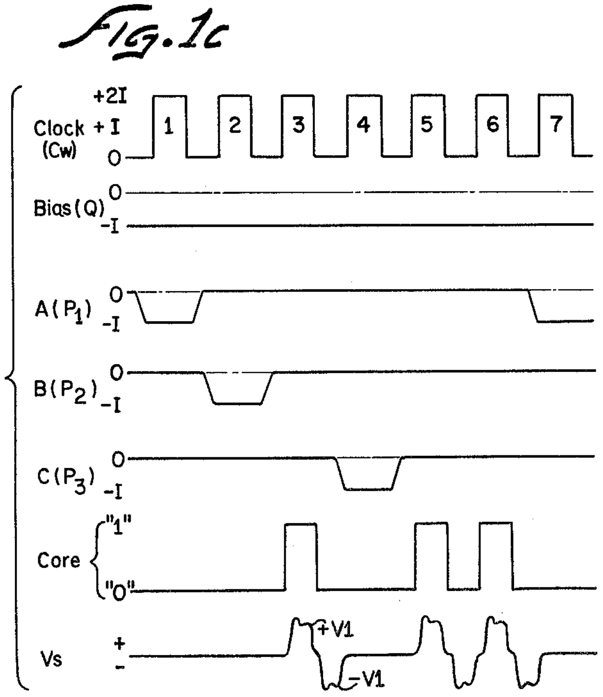
Figure 1D:
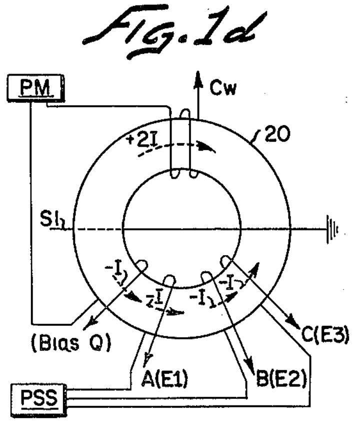

FIG. 1*c* depicts wave forms and conditions of core 20 of FIG. 1*d* during seven successive exemplary cycles of operation. The wave forms include that of the clock pulses (which are not necessarily regularly recurring or periodic as shown), the "Q" or bias current, the three inhibiting currents, A, B and C, and a sense line output potential waveform. The states of the core at the various periods of the cycles are shown in the "core" graph. Currents A, B and C are indicated as occurring or flowing at only selected times. For example, A flows throughout only clock pulse 1, B during clock pulse 2, etc. Also these currents as well as the bias current are indicated as negative to indicate the negative magnetization effect relative to the positive clock current pulses. Actual polarities or directions of current flow depend upon the directions of the respective windings, as is well understood in the art. As the currents are passed through the core windings of FIG. 1*d*, the following actions occur: at clock pulse 1, current A (which when on may represent the true state of a proposition P1 and when off may represent the false state of the proposition) is flowing, hence the core is inhibited and remains in 0 state. During clock pulse 2, current B (representing proposition $P_2$) is effective and the core is thus again inhibited from being driven to 1 by the clock pulse. During clock pulse 3, neither A, B nor C (the latter representing a proposition $P_3$) is flowing, and the clock pulse drives the core to 1, as shown on the core graph. Upon termination of clock pulse 3 the bias (Q) returns the core to 0 as indicated in the graph. As the core is driven to 1 and returned to 0, respective ones of positive and negative potential pulses +VI and —VI are generated in sense line S1, as indicated in waveform V*s* below clock pulse 3. During clock pulse 4, current C inhibits change of state of the core and no sense line output appears. During each of clock pulses 5 and 6 neither of the inhibiting currents are active and the core is therefore flipped at each pulse, with corresponding pairs of output potentials produced on the sense line, as indicated in waveform V*s*.

In FIG. 1*d* the core 20 is represented as of toroidal form (although it may be of rod-like or other form), and the windings for the clock pulses C*w* and the bias and inhibiting currents are conventionally depicted as multiple or partial turn coils. It will be understood that the inductive linkages and number of turns may be other than as shown, dependent upon the relative magnitudes of the currents, number of turns, structural arrangement, etc., all selected in accord with known good circuit design principles. The particular structural arrangement shown is purely exemplary and is used principally to aid in explaining the symbolic or "shorthand" representation of cores and windings as used, for example, in FIG. 1*e*, wherein the core 20 is represented by a circle, the +2I clock pulse C*w* by the double-pointed upwardly-directed arrow, the —I bias (Q) and the —I currents A, B and C by respective single-pointed downwardly-directed arrows, and the sense line by a horizontal line as in FIG. 1*d*. Thus the symbolic representation in FIG. 1*e* indicates that an upwardly-directed arrow represents a current tending to coerce the core to 1, and a downwardly directed arrow represents a current tending to coerce the core in the opposite direction. The number of arrow points on an arrow indicates at least approximately the relative strengths of the coercive efforts produced by the respective currents. The output or sense line, providing no appreciable coercive effect, is shown in a neutral (horizontal) attitude.

Figure 1E:
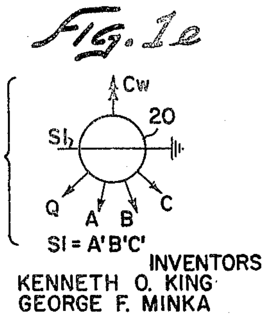

Further consideration of the previously explained matter and FIGS. 1*d* and 1*e* makes it clearly evident that with the clock current C*w* and each of currents A, B and C at zero value (inactive), the core is brought to 0 by the bias, Q. Thereafter, when a clock pulse occurs with each of A, B and C inactive, the core is flipped (driven to 1) and again flipped (returned to 0) by the clock pulse and the bias, and an output potential is produced on the sense line at each flip. Also it is evident that if any one, or all, or any combination, of A, B and C is active (current flowing) the core will be inhibited and not flipped, and if the currents A, B and C represented the previously mentioned Boolean propositions $P_1$, $P_2$ and $P_3$, no unobvious or useful operation would be performed.

As noted in the prior art literature, as in, for example, the paper entitled "Pulse Switching Circuits Using Magnetic Cores" by Karnaugh, published in the Proc. of the IRE, May 1955, at pages 570 through 583, it has heretofore been necessary to utilize a plurality of cores, with very carefully proportioned windings and carefully regulated proposition currents which are accurately timed, if more than one proposition per core is to be acommodated in a logical system using prior art techniques and practices. Thus with the arrangement of FIG. 1*d*, wherein the currents A, B and C were directly used to inhibit core 20, no unobvious result was secured. Therein, an output pulse would merely indicate that neither of the propositions was present or active. However, if, in accord wtih the novel principles of the invention, currents A, B and C were made to represent the Boolean complements or primes of the respective propositions, whereby absences of the currents would represent the respective propositions, a very useful though subtle concept is developed from which a large number of unobvious and very useful results flow directly or are readily attained. Since from FIG. 1*d* it is evident that the only time a sense line output is produced is when all of the currents A, B and C are absent, a sense line output may be considered to represent the logical product (the and function) of the absences or primes of the currents A, B and C. Thus by analogy it is evident that if the prime (absence) of an inhibiting current is used to represent a true proposition, and presence of the current is used to represent the inverse or false status of the proposition, logical products of a plurality of propositions may be formed on a sense line with but a single core. For example, in FIG. 1*e*, the structure depicted is such that a sense line output is the logical product of A', B' and C', and this is represented by the Boolean equation: $S1=A'B'C'$ shown in the lower part of the figure. Note that in this equation the clock (C*w*) and the bias (Q) have been omitted since they are, in this specific example, necessary in every operation and are understood to be present.

In computer and control procedures or operations conducted by logical operations according to the principles of Boolean algebra, it is usual for both the true and false state signals (representing both the true and false statuses of the propositions) to be made available. For example, a high voltage, or an active current, is utilized to represent the binary digit one (1) and a low voltage or absence of a current then represents the inverse, binary digit zero (0). Each is the complement or inverse of the other. With this in mind, and thus denoting binary digit-representing signals by respective alphabetical characters as was the case with Boolean propositions, an A, for example, may represent a binary one (and A' then represents the complement, or binary zero), from a given source $\underline{A}$ of binary signals. With this notation, Boolean equations representing logical operations are readily derived, and the equations then mechanized or implemented with apparatus for performing the represented operation. Hereinafter it is assumed that currents representing the true and the false states of a proposition are available, and in general, that when either is flowing or active the other is not flowing. Thus if current A is active current A' is inactive (absent), and vice versa. In accord with the principles of the invention if the logical product of A, B and C is desired to be produced as a signal, S1, the equation is written: $S1=ABC$. To implement this equation using the previously explained concept of inhibit core logic, a core with windings for the complement currents or primes of A, B and C, namely, A', B' and C', would be arranged in the fashion symbolically indicated in FIG. 1*f*. From that figure it is evident that when A' and B' and C' are inactive or absent (that is, when A and B and C are active), an output will be produced on the sense line of core 20*a*. This output can occur only when currents A and B and C are true or flowing, hence the output signal S1 represents the logical product ABC. Note, however, that the core has no windings for currents A, B and C. With this symbolic notation, it is easy to represent the mechanization of any Boolean equation. For example, in FIG. 1*g* the equation $S1=LM'N'TU'X$ representing the logical product of the variables thereof, is mechanized in the manner indicated in that figure by supplying to respective windings of core 20*b* currents representing the inverses or complements of the variables of the equation. That is, the core has applied to a winding thereon a current L' (the inverse of term L of the equation) and a current M (the inverse of term M' of the equation), a current N (inverse of term N'), etc., whereby the sense line output will occur only when currents L', M, N, T', U, and X' are all inactive, which is only when all of proposition currents LM'N'TU' and X are true (active). Note that the latter currents, although possibly existing somewhere in an apparatus, are not applied to the core. All of the inhibiting currents are, of course, of such value as to produce coercive effort of at least —I value.

Figure 1F:
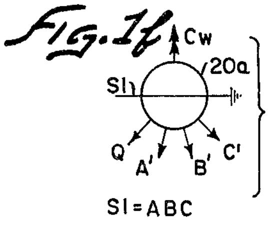
Figure 1G:
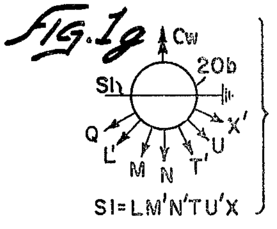
Figure 2A:
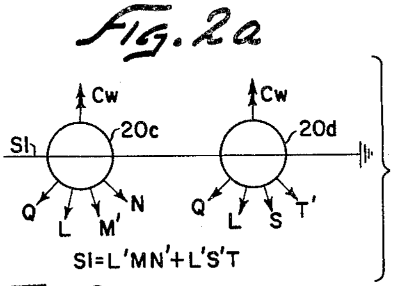
Figure 2B:
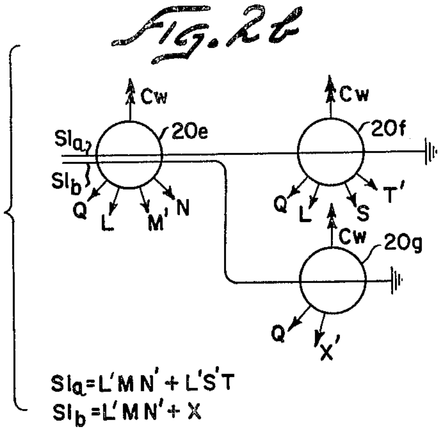

With the symbolic representation of FIGS. 1*f* and 1*g* in mind, mechanization or implementation of more complex Boolean equations involving logical sums (or functions) will be shown to be an extremely simple matter when the previously explained principles of inhibit core logic are employed. In FIG. 2*a*, for example, an output signal will be produced on the sense line S1 when currents L, M' and N linked to core 20*c* are all absent (corresponding to L', M and N' being true and active), or when currents L, S and T' linked to core 20*d* are all absent (corresponding to L', S' and T being true and active). Thus it is seen that the Boolean equation $S1=L'MN'+L'S'T$, representing the logical sum of two logical products, is satisfied by the two cores and windings thereon; and it is made evident that to produce the logical sum of logical terms it is only necessary to apply to respective cores the complements of the terms, and link to each of the cores a common sense line. The sense line output signal then represents the logical sum. This is further illustrated in FIG. 2*b*, wherein the logical product L'MN', implemented at core 20*e*, is summed with the logical product L'S'T, implemented at core 20f, to produce an output S1*a* when either or both of the logical products is produced. This logical sum of the two logical products is represented in the first equation at the lower left in FIG. 2*b*. Also illustrated in FIG. 2*b* is the concurrent mechanization of the second (lower) equation in the figure, which requires the logical summing of the previously stated logical product L'MN', with the logical term X. The logical product L'MN' is concurrently produced at core 20e (being produced on both of the sense lines S1*a* and S1*b*), and the logical term X is produced at core 20g. An output is produced on S1*b* when either or both of the terms of the equation is true. Thus it is made evident that an output signal representing any stated Boolean equation may, using the principles of the invention, be readily and economically produced. It is understood, of course, that recurrent coercive efforts capable of forcing the core or cores from 0 to 1 and return (such as the combined steady bias and the clock pulses), are in the example contemporaneously applied to all the cores. While use of the bias is not essential, its creation is simple since it is merely a constant current; and its use permits great latitude in the creation of the inhibiting currents. A single core may supply to each of a large number of sense lines an output signal representing the logical term or product implemented at that core, and a single sense line may be used to produce a signal representing the logical (or) summation of all the products or terms represented by the respective cores to which the sense line is inductively linked.

Figure 2C:
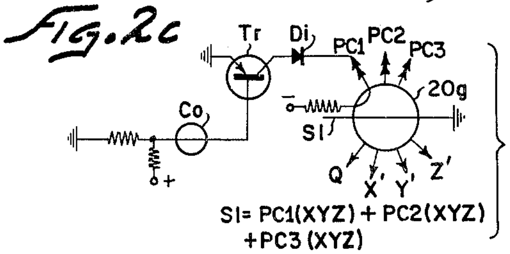

An example of a less evident way in which somewhat more complex logical functions may be mechanized is illustrated in FIG. 2*c*. In that figure, the double-strength positive clock effort is replaced by either of program count number signals PC1, PC2, PC3, of a digital computer. These signals are provided in the form of currents, only one of which can be effective or active during a given cycle of operations. At any cycle when neither of the three is active, no output can be produced and the apparatus represented is considered to be idle. However, when any one of the three is active, an output may be produced, but will be produced only if X' and Y' and Z' are inactive. Thus it is evident that the core and windings shown mechanizes the equation:

$$S1=(PC1+PC2+PC3)(XYZ)$$

which is the logical product of the logical sum $$PC1+PC2+PC3$$

with the logical product XYZ. This equation may be rewritten:

$$S1=(PC1)XYZ+(PC2)XYZ+(PC3)XYZ$$

which shows that logical sums may be obtained by use of only one core in those cases wherein one variable is common to each term of a Boolean equation and wherein in each term there is a variable not common to any other term. The figure illustrates one way in which a PC number signal is produced. In that mode, an individual core C*o*, of a program-control matrix of cores, is selected and flipped by means not of this invention. Flipping of that core induces a sense line potential which triggers a transistor T*r*, into conduction. The emitter-collector current passed through the transistor is conducted through a diode D*i* and through a winding on a core such as 20g. The sense line linked to core C*o* may also be inductively linked to other cores. Other like or similar circuit means, not shown, supply other PC signals; and it should be understood that more or fewer of the PC signals than the three shown, may be used.

Figure 3:
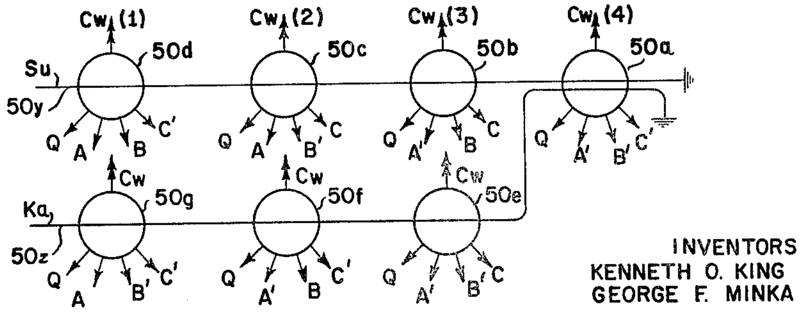
FIG. 3 is a set of diagrams illustrating how a simple digital computer component may be mechanized in accordance with principles of the invention.

To further illustrate the technique of implementing or mechanizing operational concepts according to the invention, the truth table, the Boolean equations derived therefrom, and an apparatus for mechanization of the equations, all illustrative of a device for adding an addend B and a possible carry digit C, to an augend A, to provide a sum signal S*u* and a carry signal K*a*, are depicted in FIG. 3. In the truth table there are listed the eight possible different combinations of the true and false (one and zero) states of binary numbers A, B and C, and the sum S*u* thereof, and the carry digit K*a* which will be true (a one) only when at least two of A, B and C are ones. From the truth table the equations for the sum S*u* (Eq. 1) and for the carry K*a* (Eq. 2) are derived and are as shown below the truth table. It is evident from the truth table that the sum S*u* is true ( a one) when either of the second, third, fifth and eighth of the listed combinations of A, B and C occur; and the four terms of the sum equation:

$$Su=A'B'C+A'BC'+AB'C'+ABC$$

define and represent the four alternative combinations either of which may produce a sum. Similarly in the case of the case of the carry K*a*, there is a carry (a one) if any of the fourth, sixth, seventh and eighth combinations of A, B and C obtains; and the four expressions of Equation 2 define and represent these conditions for a true or digit one value of the carry K*a*. The inhibit core logic mechanizations of the respective equations for the sum S*u* and the carry K*a* are directly derivable from the two equations themselves, and are symbolically illustrated or represented in the lower part of FIG. 3, it being important to remember that the symbolism used is the inhibit core logic mode previously explained and in which the inverse of prime of the propositions defined by the Boolean equations, are applied to the cores. Thus in the equation for the sum S*u*, the fourth (4) product term is ABC, corresponding to each of A, B and C being a one; and this is mechanized at core 50a by inhibiting driving of that core to 1, by either or all of A', B' and C' (the inverses of A, B and C, respectively). In a similar manner, the third term (3) of the equation for the sum S*u* is mechanized at core 50b, the second term (2) at core 50c and the first term, namely A'B'C, at core 50d.

It is noted that the fourth product terms of both the sum equation and the carry equation are identical, and so are enclosed in common brackets in FIG. 3. Being identical, only one core is required for generating the fourth terms of both the sum output S*u* and the carry output K*a*; and thus core 50a is linked by both the sum sense line 50y and the carry sense line 50z, saving one core. Since the remaining (first, second and third) logical product terms summed in the carry (K*a*) equation are different from any logical product terms of the sum (S*u*) equation, separate cores 50e, 50f and 50g are used in mechanizing those terms of the carry equation. Hence the carry sense line 50z is linked to core 50a and to each of cores 50e, 50f and 50g to provide the carry signal K*a*.

Now it is evident that there is required some means for supplying current signals for the inhibit windings. Means are necessary to supply respective signals representing the possible augends 0 and 1, the possible addends 0 and 1, and the possible carry 0 and 1. To meet the requirements of inhibit core logic as previously discussed in connection with FIGS. 1*a*, 1*b*, 1*c* and 1*d*, the signals must be in the form or character of currents which may inhibit the change of state of appropriate cores. In the present invention the means for providing signals A, B and C, and the primes thereof, selectively, is in each instance a dual-input dual-output bistable-state circuit device similar in some respects to a bistable trigger circuit or flip-flop. This device furnishes a true output current signal on a true output line in response to a true potential input signal applied to a true input line. Also the device has a complementary false input line for false input signals which are effective to trigger the device to the false state and provide a false output current signal on a corresponding false output line. The actual circuitry comprised in one of these bistable state devices is depicted diagrammatically in FIG. 5.

Figure 5:
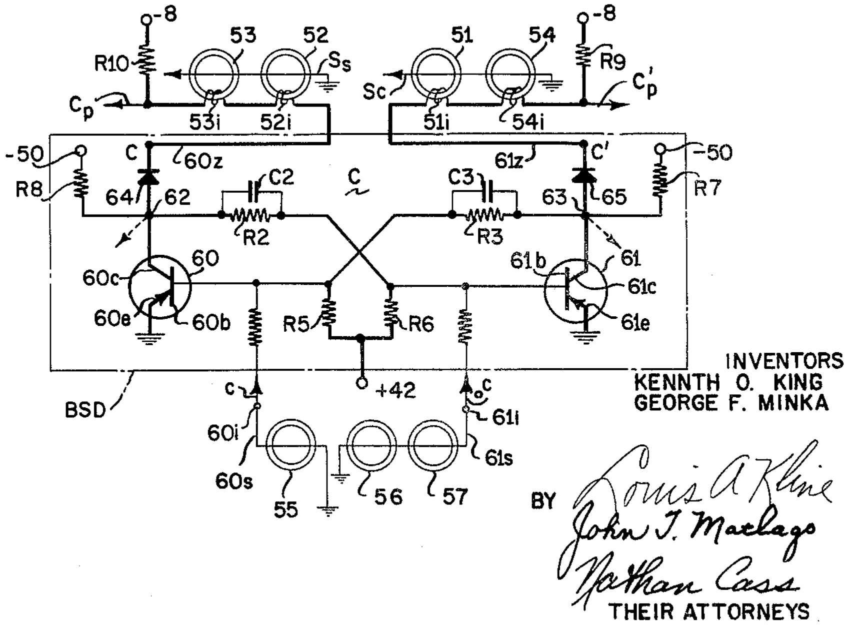
FIG. 5 is a circuit diagram depicting a bistable device according to the invention, as utilized in the adder schematically depicted in FIG. 4.

In FIG. 5, 60 and 61 are alternately conductive transistors cross-connected as indicated to form a bistable circuit designated generally by the symbol C. The transistors comprise respective bases 60*b*, 61*b*, respective emitters 60*e*, 61*e*, and respective collectors 60*c*, 61*c*. The collectors are connected to respective junctions 62, 63; and cross-connections from respective ones of these junctions to the base of the opposite transistor are made through coupling networks comprising resistor R2, capacitor C2, and resistor R3, capacitor C3, respectively, as indicated. A special biasing current path through R2 and junction 62 includes resistor R6 connected to a positive power supply pole or terminal +42, and a resistor R8 connected between junction 62 and a negative power supply pole −50. Similarly, a complementary current path is provided through R5, R3 and R7, as indicated.

Thus respective currents normally flow through respective paths +42, R6, R2, 62, R8, −50, and +42, R5, R3, 63, R7, −50, and one of the transistors is conductive and the other is as a result biased to nonconductive state, or off. Assuming that transistor 60 is made conductive, as by application of a negative potential pulse to its base 60*b*, junction 62 will be brought to ground potential, and junction 63 will be at about −12 units (volts, for example), due to the current from +42 through resistors R5, R3 and R7. With the potential at junction 62 thus raised from −12 to ground potential, transistor 61 is securely biased off and diode 64 is forward biased into conduction and current flows from ground through the emitter-collector circuit of junction 62, transistor 60, junction 62, diode 64 and the load interest of simplicity. Obviously, triggering potentials may be secured from sources other than sense lines linked to cores, since any source of negative-going pulses is sufficient for the purpose.

Thus it is evident that with either of the transistors 60 and 61 conductive, a negative-going triggering pulse applied to the input terminal of the opposite transistor circuit will change the conductive state of the device C, in a manner similar to that evidenced in an ordinary bistable trigger circuit or flip-flop. Further, the bistable circuit means or device, depicted in the dash-line rectangle BSD in FIG. 5, thus provides, through the current conducted through transistor 60 and diode 64 (or, alternatively, that conducted through transistor 61 and diode 65), a current which may be employed as the prime of a proposition to inhibit reversal of state of as many magnetic cores as the respective output line is inductively linked to; and this without the necessity for the current to provide any power for reversing the state of any core. As depicted in FIG. 5, diode 64 is interposed in a line 60*z* connecting junction 62 to the negative (−8) power source pole or terminal through inhibit windings on cores 52 and 53 to each of which cores a sense line S*s* is inductively linked. Similarly transistor 61 and diode 65 may pass current via a line 61*z* through inhibit windings on cores 51 and 54 to each of which a sense line S*c* is linked. It will be noted that, since when the current or signal C (or C′) is flowing in an output line, no core to which that line is linked can be circuit to a −8 terminal of a power supply. In this example the load comprises respective inhibit windings 52*i*, 53*i* on cores 52, 53, respectively, and a current limiting resistor R10. It is evident that if, under these condition, a false trigger pulse $_0c$ of negative polarity is applied at the false input terminal 61*i* of the device as indicated, a very small base-current of very low power requirement will flow in transistor 61, and the latter will thereby be triggered into conduction. As conduction increases, the potential at junction 63 increases from −12 to ground potential and that positive-going potential is applied through resistor R3 to the base 60*b* of transistor 60 and serves to bias the latter to cut-off. Thus there is imposed upon the input or triggering pulse only a very low power requirement, the current through the transistor furnishing the cut-off power. In the exemplary device according to the invention the trigger input potential is the potential induced in a sense line as a core is reversed in state. For example the true trigger signal or input, *c*, for bistable device C is generated upon a sense line 60*s* linked to a core 55 as indicated in FIG. 5. Similarly the false input signal, $_0c$, to device C is generated on a sense line 61*s* linked to each of cores 56 and 57. Since only a very low-power pulse is required to trigger either of transistors 60 and 61, very little power is required to be furnished by the core or cores linked to the respective trigger sense line. While cores 55, 56 and 57 have other windings thereon, such other windings are here omitted in the reversed in state and there can be no back voltage induced in that line. Also, conversely, when a core, such as 51, 52, 53 or 54, is driven to 1 state and back voltage is induced in the respective drive winding or line, there is no current flowing in the line (since the respective diode, 64 or 65 as the case may be, is back biased against conduction). Hence the diodes serve as buffers and prevent output load fluctuations and noise potentials from affecting the stability of the device C in either of its two states.

While in the presently explained illustrative embodiment of a bistable signal device according to the invention, the true and false output signals are currents, the bistable-state device C depicted in FIG. 5 can as well be employed to provide true and false potential output signals in the event that is desirable. These potential signals are derived across respective ones of resistors R10 and R9, as indicated by the respective arrow connections $C_p$ and $C_p'$ to the lower ends of respective ones of those resistors. This is distinctively different from the usual flip-flop output signals, which would be derived as potentials at junctions 62 and 63 as indicated by the broken-arrow connections at those points and would thus subject the bistable state device to possibility of unwanted triggering by load fluctuations or noise potentials. And while in FIG. 5 the connections for the output currents or signals C and C′ are shown as each linking two cores, it is clear that any number of cores may be so linked and effectively inhibited from changing state by either of the respective inhibit signals. Since no power need be supplied by the inhibiting current, there is no possiblity of overloading the relatively simple power supply means needed to supply the current. When one of the input signal cores, such as 55, 56 or 57, is driven from 0 to 1 and returned to 0, both positive and negative pulses are produced on the sense line and applied to a transistor base The positive-going pulse merely further biases the transistor off, and only the negative-going pulse is effective to trigger the bistable device. Such is the operation in the specific circuit shown; however, if NPN transistors were used, or the direction of the sense winding were reversed, the pulse produced as the core is driven from 0 to 1 could be used for triggering. In exceptional cases this expedient may be used, but generally triggering will be effected as the core is returned from 1 to 0.

Figure 4:
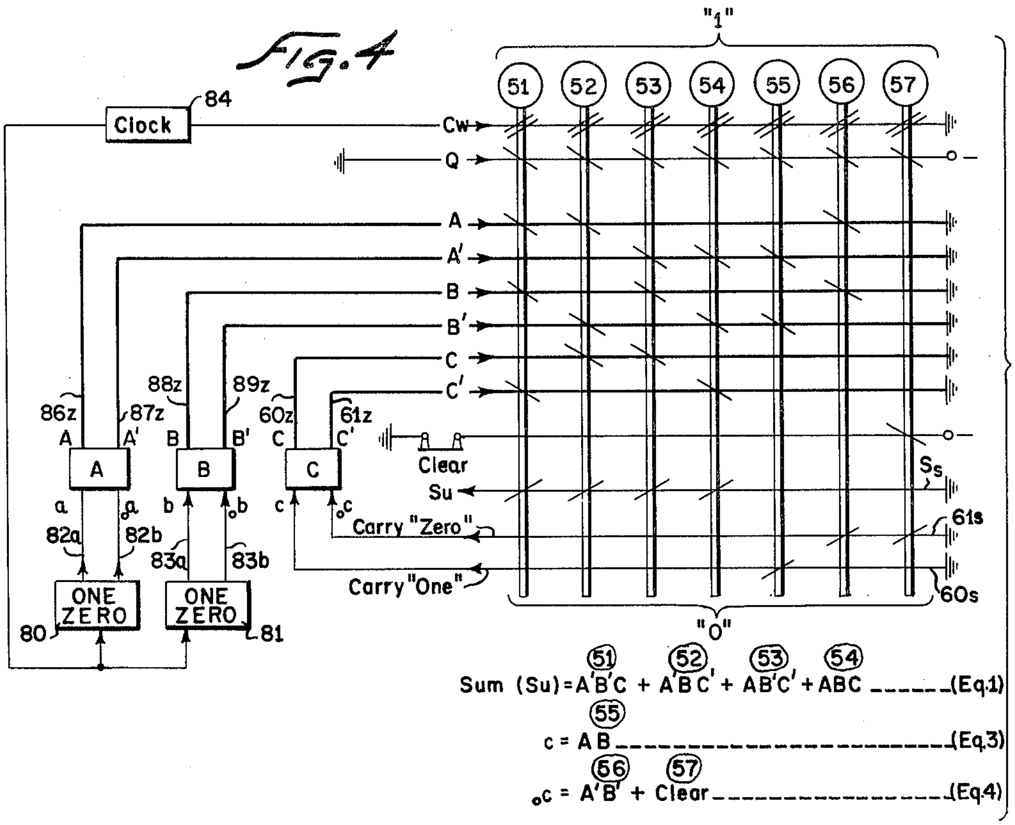
FIG. 4 is a diagram illustrating the electronic construction of a simple exemplary serial adder according to principles of the invention, and the applicable Boolean equations.

In FIG. 4 there is diagrammatically illustrated a computer component in the form of a serial binary adder composed as an exemplary structure according to the principles of the invention, and arranged to perform the addition operations as defined in FIG. 3. In this exemplary computer component chosen to illustrate the practical application of the principles of the invention, binary signals representing an augend are supplied by a signal means 80, and similar signals representing an addend are supplied by a means 81. The signals are negative-going potentials, those representing the digit one appearing on line 82*a* for the augend, and on line 83*a* for the addend, and those representing digit zero appearing on lines 82*b* and 83*b*, as indicated by the labels. Both of the signal means 80 and 81 may be controlled by clock signals from a clock 84 as indicated. The clock supplies pulses of the nature of those illustrated in FIG. 1c. The input digital augend and addend signals are supplied to respective bistable state devices, A and B each of which is of the type previously explained in connection with FIG. 5, and which devices are used to store the augend and addend input digits during a cycle of operations. The arrangement is such that signals representing digit zero will be applied via line 82b (or 83b) as the signal $_oa$ (or $_ob$) to the off or false input terminal of the respective device A (or B), and thus trigger the device to the false state and cause an output current to flow in line $87_z$ (signal A′) or in line $89_z$ (signal B′), as the case may be. Similarly, a signal from 80 (or 81) representing the digit one, will be applied on a respective line 82a (or 83a) as the true input a, to device A (or as the true input b, to device B), as the case may be. Accordingly, device A will selectively supply current on either of output lines 86z, 87z, the currents being termed signals A and A′, respectively, and each being of coercive value at least sufficient to inhibit change from 0 to 1 of any core to which the respective output line is linked. Similarly, the currents selectively supplied by device B are termed B and B′, and are of at least −I coercive value. The adder includes the aforedescribed device C as the means for temporarily storing and supplying the carry signal, C or C′ (carry one or carry zero, respectively) to the logic-performing cores and windings.

In FIG. 4 the respective cores of the adder are shown as vertically disposed slim rectangles, each numbered as indicated in a circle at the upper end thereof. Windings on a core are indicated by slant-lines at intersections of the core with respective selected output current lines which are shown as horizontal lines. For example, core 51 has a winding for clock signal Cw (double slant line at the intersection of the clock pulse and the core), a winding for bias signal Q, an individual winding for each of currents A, B and C′, and a sense winding connected in sense line Ss on which is generated the sum signal Su. The other cores have windings as indicated. The directions of the various signal currents are indicated by arrow points in the respective lines at the left of core 51. The convention or symbolism employed in FIG. 4 is similar to that discussed to some extent in the aforementioned paper by Karnaugh and now well known in the art as the mirror notation, wherein if the slant-line representing a winding were a mirror and the current in the current line were a beam of light traveling in the same direction as the current, the light would be reflected either upwardly (1) or downwardly (0) according to the direction of the slant line; and the interpretation is that if the light were thus reflected upwardly the current would tend to coerce the core in the direction of the 1 state and if it were reflected downwardly the current would tend to coerce the core to 0. Thus in FIG. 4 the upper ends of the cores are as a group labeled 1 and the lower ends are similarly labeled 0. On current-carrying windings, double slant lines indicate the aforedescribed 2I (double strength) coercive effort, and single slant lines denote 1I coercive effect or effort, with possible exceptions and modifications as hereinafter noted. Thus the clock signal Cw is applied with 2I positive (upward) effect and the bias (Q) continually exerts a negative coercive effort of value −I tending to drive or hold the cores to 0. Signals A, A′, B, B′, C and C′ may in this example each be of coercive strength 1I or greater (in general) and are individually applied in the negative direction to cores as indicated. For example, current A is applied to each of cores 51, 52 and 56. A clear signal of 1I effect or greater is normally continuously applied and is effective on only core 57. Three sense lines, Ss, 60s and 61s are linked by windings to cores as indicated, and it is in these lines that signals representing the sum Su, the one carry, and the zero carry, are generated when certain cores are flipped as a result of having not been inhibited.

The cores and windings arrangement in FIG. 4 is the physical embodiment or mechanization of the Boolean equations (Eq. 1, Eq. 3, and Eq. 4) set out at the lower part of the figures. The reason for substituting Eqs. 3 and 4 for Eq. 2 of FIG. 3 will hereinafter be explained. Each of the terms of the equations is assigned an individual core. As indicated by the corresponding numerals in circles above the terms of the equations in FIG. 4, the first term of Eq. 1 is mechanized by or upon core 51, the second term is mechanized by core 52, etc. For example, the first sum term (derived from line 2 of the truth table in FIG. 3) is A′B′C. Remembering that in applying inhibiting currents to the cores in accord with the previously explained principles of inhibit core logic, the inverses of the terms are actually applied as inhibiting currents, it is noted that core 51 has windings for application thereto of signal currents A, B and C′ (the inverses of the first term of Eq. 1). Thus when the signal from source 80 representing the digit zero is applied to the false or $_oa$ input side of device A via line 82b, the device is triggered to produce a current output (A′) on lead 87z. Lead 87z is coupled to cores 53, 54 and 55, which are thereby inhibited by signal A′. Similarly, in the case of the digit zero signal from source 81, the signal is applied via 83b to the $_ob$ input line of device B and the latter will be triggered to produce a B′ output current signal on lead 89z. Lead 89z has windings coupled to cores 52, 54 and 55, which are thereby inhibited. A one carry is represented in the first term of Eq. 1, hence device C will be producing an output C as a current on line 60z, and cores 52 and 53 are thereby inhibited. Thus at any cycle of the adder at which A is a zero, B is a zero, and the carry is a one, each of cores 52, 53, 54 and 55 is inhibited (together with core 57 which is normally inhibited by the steady clear signal). Cores 51 and 56, however, are not inhibited, and will be flipped by the next clock pulse Cw and the bias Q at the termination of the clock pulse. Thus at the termination of the clock pulse a negative-going pulse is generated on sense line Ss, indicating a one sum signal Su, and a similar pulse is generated on sense line 61s, triggering device C to the false state to generate a C′ (carry digit zero) signal. Thus the logical product A′B′C, the first term of Eq. 1, has been shown to be produced in response to the input signals to provide the desired and expected addition of B′ (0) and C (1) to A′ (0) to get a sum Su of one and a zero-carry. The other possible combinations of A, B and C, as listed in the truth table, may similarly be tested and found to yield correct sum and carry outputs on lines Ss, 61s and 60s.

In the sum and carry equations set up in FIG. 3, as developed from the truth table, there were four terms in each equation, one of the terms being common to both the sum and carry. While the mechanization of the adder could follow the representation at the lower part of FIG. 3 and include seven cores to produce all the terms, a comparison of the C signal (truth table, fourth column) with the generated carry signal Ka in the sixth column, shows that the two differ for only two of the eight possible combinations of inputs. That is, they differ only for the second and seventh of the combinations. In the second combination, the change of the carry, Ka, relative to C is from 1 to 0, and this is indicated in the next-to-last column of the truth table. In the seventh combination, the change of Ka relative to C is from 0 to 1, as indicated in the last column of the table. Thus the output (and hence the state) of the C device does not require to be changed except when A and B are both zero (second combination), and when A and B are both one (seventh combination). Accordingly, rather than use seven cores to mechanize Eqs. 1 and 2, saving of one core can be effected by using one core to change device C from true to false (C to C′) and one core to change the device from false to true (C′ to C). Equations 3 and 4 (FIG. 4) show that the true trigger input c to device C, necessary to change from C′ to C (corresponding to the seventh combination) is produced by flipping of core 55 when digit A and digit B are both one. In inhibit core logic, this means that the core should be flipped when both of current signals A′ and B′ are zero and current signals A and B are in effect. Hence core 55 bears windings for A′ and B′ and can be flipped only when both of the latter signals are zero and thus only when currents A and B are effective. Core 55 also has a clock winding of 2I effect, a bias (Q) winding, and a sense line winding connected in line 60*s*, so device C is triggered true by an output potential produced on sense line 60*s* when currents A and B are both flowing (the inverse of A and B each being zero). A similar mechanization of Eq. 4 on core 56 requires windings for the clock, bias, A, and B; and a sense winding connected in the false ($_0$C) input line 61*s* of device C, whereby the device is triggered to produce signal current C (no carry) whenever A and B are both false.

Thus the apparatus portrayed in FIG. 4 is effective to add to successive augends the corresponding successive addends and to store and add any next-previously created carry digit. At the termination of the serial addition of the binary digits of multi-digit numbers, the carry-storage device, C, may be reset to zero by any suitable mode and means. In the exemplary adder of FIG. 4, device C is easily reset or cleared by opening the clear switch to interrupt the normally active current in the clear line, thus permitting core 57 to be flipped. Core 57 has a sense winding connected in sense line 61*s* and hence the latter will be pulsed when core 57 is flipped, and thus device C will for certain be brought to the false state if not already in that condition. The clear term in the false triggering input equation (Eq. 4) for device C is mechanized by core 57.

From the preceding description it is evident that the novel bistable device, such as device C, requires but a very small power input to trigger it to either state from the other of its two stable states, and in either state supplies a current representative of that state and eminently suitable for inhibiting the driving of cores by the clock (C*w*) pulses. Also it is noted that the device is such that backwardly generated potentials in an output line of the device can have no adverse effects on the device itself because of the blocking effect of the diode (64 or 65 in device C). While in the illustrative embodiment of apparatus no back voltage of any appreciable magnitude can be induced by core windings because no core can reverse in state while an output current flows in a winding linked to the core, nevertheless in some types of apparatus such potentials can present serious problems necessitating special buffer amplifier stages in the output circuits. Further, it is evident that one or more sense lines, each linked to one or more cores, may be used directly for providing the very low-power triggering pulses needed to trigger the device from one state to the other, and also it is evident that since only a small amount of triggering power is required, relatively small cores may be employed. As noted, too, the bistable state device C may also supply true and false potential outputs either with, or without, used current outputs.

Also it is evident from the description of the mode of operation of the apparatus using the principles of inhibit core logic, that the matter of time-coincidence and relative magnitudes of proposition signals is not at all critical, the only essential being that the inhibit signals attain inhibiting value prior to commencement of the clock pulse and maintain that value until after the clock pulse decays. Further, the magnitudes of the inhibit signals may be much greater than is necessary for core inhibiting, without adverse effect. In fact, as is indicated in FIG. 1*b*, the shuttle potentials induced in core windings are reduced when the negative inhibit signals are of greater than 1I effect, since the core then operates farther out along the saturation limb of the B-H diagram. The shuttle voltages involved due to the slight change (*b*) of magnetization when one or two, or more, inhibiting currents become effective, are shown by FIG. 1*b* to decrease markedly as the number and/or magnitude of inhibiting currents increases. Since the amplitudes of any or all of the inhibiting currents can safely be such as to produce considerably more than −1I coercive effect for each such current, the selection of circuit hardware and power supplies is much less critical than is usual in logical circuitry.

Additionally it will be evident that by using what is herein termed inhibit core logic it is possible to mechanize a logical product of N propositions with a single core and without the necessity for precise control of current amplitudes nor precise control of coincidence of signals. The bistable state devices are triggered to change state during the read period, that is, during the interval between the fall of the clock pulse and commencement of the next succeeding clock pulse. Actually, the bistable state device, such as A, B and C, changes state nearly instantly after the logical operation is performed by the core as it flips but the substantially contemporaneous change in the output signal cannot change the performed operation; and this allows plenty of time for the aforedescribed low-power triggering of a device in two stages to occur.

The preceding description of a practical embodiment of apparatus according to the concepts and principles of the invention demonstrate attainment of the aforestated objects of the invention. In the light of the present disclosure it will be evident to those skilled in the art that the invention provides a new and powerful technique for mechanization of logical digital processes, and a simple means therefor which is eminently adapted to simple and easy maintenance procedures and which in fact requires much less maintenance of logical elements than is usual in logical circuitry. The invention provides a simple way of performing inhibit core logic in a two-phase cycle with a minimum of apparatus and utilization of currents which are not critical. Cores are not required to serve as transformers to furnish power to flip other cores, and thus selection of cores is noncritical. The inhibiting currents, being not required to furnish power to flip cores, are producible by noncritical means; and the bistable state devices effective to produce such currents are simple and well-protected against being triggered by noise potentials generated in inhibit windings. Further, the bistable state device disclosed is such as to require a practically negligible amount of input power for initially triggering the device for initiating a change from either state to the other, since the power needed to bias the presently conductive transistor to cut-off is supplied by the initial current surge through the opposite transistor. In the light of the disclosure changes and modifications are evident to those skilled in the art, hence it is not desired to limit the invention to the specific exemplary mode and apparatus described.

What is claimed is:

1. Apparatus for translating binary input signals supplied as potentials on respective first and second input signal lines, into corresponding binary output current-signals on corresponding first and second output signal lines, said apparatus being electrically symmetrical and comprising: first and second transistors; first and second potential dividers each comprising first, second and third resistors and each having a first junction between its first and second resistors and a second junction between its second and third resistors; means for energizing said potential dividers to provide thereacross a potential difference including positive and negative potentials with respect to a neutral potential; first and second diode means; first and second current-circuit means providing respective output signal lines for alternatively supplying either of first and second current-signals serially through a respective transistor and through a respective first junction and through a respective diode and through a respective output signal line; and first and second trigger circuit means each connected to a trigger element of a respective transistor and to a respective trigger input line and to the second junction of the opposite potential divider, whereby application of a triggering potential on either one of said trigger input lines triggers into conduction the respective transistor and permits current flow therethrough to thereby bring the respective first junction to said neutral potential and thereby bias the opposite transistor to nonconductive state and thereby selectively provide an output current-signal on but one of said output lines at a time and selectively as determined by application of a trigger potential.

2. In apparatus for performing logical operations and including at least one bistable magnetic core coercible from either of its states to the other and having a power winding, at least one inhibiting winding and an output winding coupled thereto, said apparatus also including means for applying a power signal to said power winding for switching said core unless inhibited by an inhibiting signal applied to said inhibiting winding, the improvement comprising transistor circuit means responsive to output signals induced in said output winding for providing an inhibiting signal for application to said inhibiting winding, said transistor circuit means comprising: first and second transistors each comprising a base, an emitter and a collector, means coupling said output winding to the base of said first transistor, means coupling the collector of said first transistor to the base of said second transistor and the collector of said second transistor to the base of said first transistor so as to provide for bistable operation of said circuit means in response to the signal induced in said output winding as a result of the switching of said core, a diode, and means coupling the collector of one of said transistors to said inhibiting winding through said diode, said diode being poled in a direction so as to permit the inhibiting signal to be applied from said circuit means to said inhibiting winding while isolating said circuit means from signals induced in said core except via said output winding.

3. In apparatus for performing logical operations and including at least one bistable magnetic core coercible from either of its states to the other and having a power winding, at least one inhibiting winding and an output winding coupled thereto, said apparatus also including means for applying a power signal to said power winding for switching said core unless inhibited by an inhibiting signal applied to said inhibiting winding, the improvement comprising transistor circuit means responsive to output signals induced in said output winding for providing an inhibiting signal for application to said inhibiting winding, said transistor circuit means comprising: first and second transistors, means coupling said output winding to the input of one of said transistors, means interconnecting said transistors for bistable operation in response to the signal induced in said output winding as a result of the switching of said core, a diode, and means coupling the output of one of said transistors to said inhibiting winding through said diode, said diode being poled in a direction so as to permit the inhibiting signal to be applied from said circuit means to said inhibiting winding while isolating said circuit means from signals induced in said core except via said output winding.

4. In apparatus for performing logical operations and including at least one bistable magnetic core coercible from either of its states to the other and having a power winding, at least one inhibiting winding and an output winding coupled thereto, said apparatus also including means for applying a power signal to said power winding for switching said core unless inhibited by an inhibiting signal applied to said inhibiting winding, the improvement comprising transistor circuit means responsive to output signals induced in said output winding for providing an inhibiting signal for application to said inhibiting winding, said transistor circuit means comprising: first and second transistors each comprising a base, an emitter and a collector, means coupling said output winding to the base of said first transistor, means coupling the collector of said first transistor to the base of said second transistor and the collector of said second transistor to the base of said first transistor so as to provide for bistable operation of said circuit means in response to the signal induced in said output winding as a result of the switching of said core, a load impedance means, a diode coupled to the collector of one of said transistors, and means coupling said inhibiting winding between said load impedance means and said diode, said diode being poled in the direction of inhibit current flow.

5. In apparatus for performing logical operations and including at least one bistable magnetic core coercible from either of its states to the other and having a power winding, at least one inhibiting winding and an output winding coupled thereto, said apparatus also including means for applying a power signal to said power winding for switching said core unless inhibited by an inhibiting signal applied to said inhibiting winding, the improvement comprising transistor circuit means responsive to output signals induced in said output winding for providing an inhibitive signal for application to said inhibiting winding, said transistor circuit means comprising: first and second transistors each comprising a base, an emitter and a collector, means including first and second impedance means and first and second voltage sources for coupling the collector of said first transistor to the base of said second transistor and the collector of said second transistor to the base of said first transistor so as to provide for bistable operation of said circuit means in response to the signal induced in said output winding as a result of the switching of said core, a third impedance means, a third voltage source connected to one end of said third impedance means, a diode, and means coupling one end of said inhibiting winding to the other end of said third impedance means and the other end of said inhibiting winding to the collector of one of said transistors through said diode, said diode being poled in the direction of inhibit current flow.

6. In apparatus for performing logical operations and including a plurality of bistable magnetic cores each coercible from either of its states to the other and each having a power winding, at least one inhibiting winding and an output winding coupled thereto, said apparatus also including means for applying a power signal to each power winding for switching each core unless inhibited by an inhibiting signal applied to its respective inhibiting winding, the improvement comprising transistor circuit means responsive to output signals induced in the output winding of at least one of said cores for providing at least one inhibiting signal for application to the inhibiting winding of at least one of said cores, said transistor circuit means comprising: first and second transistors, means coupling the output winding of at least one of said cores to to input of one of said transistors, means coupling the output winding of at least another one of said cores to the input of the other of said transistors, means interconnecting said transistors for bistable operation in response to the output signals applied to said inputs, first and second diodes, means coupling the output of one of said transistors to the inhibit winding of at least one of said cores through said first diode, and means coupling the output of the other of said transistor to the inhibit winding of at least another of said cores through said second diode, each of said diodes being poled in the direction of inhibit current flow.

7. In apparatus for performing logical operations and including a plurality of bistable magentic cores each coercible from either of its states to the other and each having a power winding, at least one inhibiting winding and an output winding coupled thereto, said apparatus also including means for applying a power signal to each power winding for switching each core unless inhibited by an inhibiting signal applied to its respective inhibiting winding, the improvement comprising transistor circuit means responsive to output signals induced in the output winding of at least one of said cores for providing at least one of inhibiting signal for application to the inhibiting winding of at least one of said cores, said transistor circuit means comprising: first and second transistors, each of said transistors including a base, an emitter and a collector, means coupling the output winding of at least one of said cores to the base of one of said transistors, means coupling the output winding of at least another of said cores to the base of the other of said transistors, means interconnecting said transistors for bistable operation in response to the output signals applied to said bases, first and second diodes, means coupling the output of one of said transistors to the inhibit winding of at least one of said cores through said first diode, and means coupling the output of the other of said transistors to the inhibit winding of at least another of said cores through said second diode, each of said diodes being poled in the direction of inhibit current flow.

8. In apparatus for performing logical operations and including a plurality of bistable magnetic cores each coercible from either of its states to the other and each having a power winding, at least one inhibiting winding and an output winding coupled thereto, said apparatus also including means for applying a power signal to each power winding for switching each core unless inhibited by an inhibiting signal applied to its respective inhibiting winding, the improvement comprising transistor circuit means responsive to output signals induced in the output winding of at least one of said cores for providing at least one inhibiting signal for application to the inhibiting winding of at least one of said cores, said transistor circuit means comprising: first and second transistors, each of said transistors including a base, an emitter and a collector, means coupling the output winding of at least one of said cores to the base of one of said transistors, means coupling the output winding of at least another of said cores to the base of the other of said transistors, means coupling the collector of said first transistor to the base of said second transistor and the collector of said second transistor to the base of said first transistor so as to provide for bistable operation of said circuit means in response to the output signals applied to said bases, first and second diodes, means coupling the output of one of said transistors to the inhibit winding of at least one of said cores through said first diode, and means coupling the output of the other of said transistors to the inhibit winding of at least another of said cores through said second diode, each of said diodes being poled in the direction of inhibit current flow.

9. In apparatus for performing logical operations and including a plurality of bistable magnetic cores each coercible from either of its states to the other and each having a power winding, at least one inhibiting winding and an output winding coupled thereto, said apparatus also including means for applying a power signal to each power winding for switching each core unless inhibited by an inhibiting signal applied to its respective inhibiting winding, the improvement comprising transistor circuit means responsive to output signals induced in the output winding of at least one of said cores for providing at least one inhibiting signal for application to the inhibiting winding of at least one of said cores, said transistor circuit means comprising: first and second transistors, means including first and second impedance means and first and second voltage sources for coupling the collector of said first transistor to the base of said second transistor and the collector of said second transistor to the base of said first transistor so as to provide for bistable operation of said circuit means in response to the signal induced in said output windings applied to said bases, third and fourth impedance means, third and fourth voltage sources, means connecting said third voltage source to one end of said third impedance means, means connecting said fourth voltage source to one end of said fourth impedance means, means coupling one end of an inhibiting winding to the other end of said third impedance means and the other end of the inhibiting winding to the collector of one of said transistors through one of said diodes, and means coupling one end of another inhibiting winding to the other end of said fourth impedance means and the other end of said another inhibiting winding to the collector of the other of said transistors through the other of said diodes, said diodes being poled in the direction of inhibit current flow.

10. The invention in accordance with claim 9, wherein means are provided coupled to the ends of said third and fourth impedance means which are opposite from the ends coupled to said third and fourth voltage sources for providing binary voltage output signals.

No references cited.

IRVING L. SRAGOW, *Primary Examiner.*